United States Patent
Nagata et al.

(10) Patent No.: US 9,363,979 B2
(45) Date of Patent: Jun. 14, 2016

(54) PRIMATE RESTRAINT DEVICE

(71) Applicant: SHIN NIPPON BIOMEDICAL LABORATORIES, LTD., Kagoshima-shi, Kagoshima (JP)

(72) Inventors: Ryoichi Nagata, Kagoshima (JP); Masatoshi Kashima, Kagoshima (JP); Hiroaki Magotani, Kagoshima (JP)

(73) Assignee: SHIN NIPPON BIOMEDICAL LABORATORIES, LTD., Kagoshima-Shi, Kagoshima (JP)

( * ) Notice: Subject to any disclaimer, the term of this patent is extended or adjusted under 35 U.S.C. 154(b) by 0 days.

(21) Appl. No.: 13/639,908

(22) PCT Filed: Oct. 1, 2012

(86) PCT No.: PCT/JP2012/075307
§ 371 (c)(1),
(2) Date: Oct. 8, 2012

(87) PCT Pub. No.: WO2013/175652
PCT Pub. Date: Nov. 28, 2013

(65) Prior Publication Data
US 2015/0128871 A1 May 14, 2015

(30) Foreign Application Priority Data
May 22, 2012 (JP) .................................. 2012-116136

(51) Int. Cl.
*A01K 1/03* (2006.01)
*A01K 1/06* (2006.01)

(52) U.S. Cl.
CPC .............. *A01K 1/031* (2013.01); *A01K 1/0613* (2013.01)

(58) Field of Classification Search
CPC ....... A01K 1/00; A01K 1/0005; A01K 1/031; A01K 1/03
USPC ................... 119/417, 416, 452, 472
See application file for complete search history.

(56) References Cited

U.S. PATENT DOCUMENTS 3,905,333 A * 9/1975 Uhrig ............................. 119/479
4,040,545 A * 8/1977 Hill ................................. 223/85
(Continued)

FOREIGN PATENT DOCUMENTS

| JP | 7-147862 A | 6/1995 |
| JP | 8-24506 B2 | 3/1996 |

(Continued)

OTHER PUBLICATIONS

Nagata et al., "Improvement of Purchased Monkey Chair for Experiments of Brain Higher Function", Annual Report of the Technical Division of National Institute of Physiological Sciences, No. 10, Oct. 1, 1995, pp. 40-43. With English Translation.
(Continued)

*Primary Examiner* — David Parsley
*Assistant Examiner* — Magdalena Topolski
(74) *Attorney, Agent, or Firm* — Westerman, Hattori, Daniels & Adrian, LLP

(57) ABSTRACT

When a primate is t restrained by a movable partition wall, friction with vertical bars of a lattice of the partition wall causing damages on roots of limbs of the primate is alleviated to reduce or solve such damages. In a primate restraint device comprising a containing body having both side surfaces, a top surface and a bottom surface, a rear surface door capable of opening and shutting the rear surface side of the containing body, and a partition wall formed movably frontward and rearward in the containing body and capable of being fixed at a desired position in the containing body, some sites among vertical bar members of the partition wall, with which roots of limbs of the primate are brought into contact while the limbs are forced to protrude frontward and restrained, are covered with protective cylinders which are rotatable with respect to the vertical bar members.

6 Claims, 7 Drawing Sheets

(56) References Cited

U.S. PATENT DOCUMENTS

| | | | |
|---|---|---|---|
| 4,770,127 A * | 9/1988 | Volk | 119/473 |
| 5,373,810 A * | 12/1994 | Martin | 119/459 |
| 5,571,241 A | 11/1996 | Nagata | |
| 5,924,388 A * | 7/1999 | Peeples | 119/814 |
| 7,806,088 B2 | 10/2010 | Osada et al. | |
| 2007/0272166 A1 * | 11/2007 | Kanno | 119/420 |
| 2009/0090302 A1 * | 4/2009 | Conrad et al. | 119/28.5 |
| 2009/0090303 A1 | 4/2009 | Osada et al. | |
| 2009/0266309 A1 | 10/2009 | Hunter et al. | |
| 2010/0175629 A1 * | 7/2010 | Garmon | 119/419 |
| 2012/0186529 A1 * | 7/2012 | Cantwell et al. | 119/474 |
| 2012/0186531 A1 | 7/2012 | Nagata | |
| 2012/0186532 A1 | 7/2012 | Nagata | |
| 2013/0019410 A1 * | 1/2013 | Willis | 5/663 |
| 2014/0230740 A1 * | 8/2014 | Mihlbauer et al. | 119/246 |
| 2014/0305378 A1 * | 10/2014 | Lever et al. | 119/417 |

FOREIGN PATENT DOCUMENTS

| | | |
|---|---|---|
| JP | 11-9129 A | 1/1999 |
| JP | 2008-167657 A | 7/2008 |
| WO | 2007/034588 A1 | 3/2007 |
| WO | 2011/016546 A1 | 2/2011 |
| WO | 2011/016547 A1 | 2/2011 |

OTHER PUBLICATIONS

Togawa et al., "Prototype of Monkey Chair for experiments of Brain Higher Function", Annual Report of the Technical Division of National Institute for Physiological Sciences, No. 9, Sep. 1, 1994, pp. 50-53. With English Translation.

Kamimura, "About Training as to Treatment of Primates in the Primate Research Institute, Kyoto University", Japanese Association for Experimental Animal Technologists Hokkaido Shibu Kaishi, No. 21, Sep. 1, 1997, pp. 23-26. With English Translation.

Chinese Office Action dated Jun. 5, 2014, issued in corresponding Chinese Patent Application No. 201280001621.0 (5 pages).

Nagata et al., "Improvement of Purchased Monkey Chair for Experiments of Brain Higher Function", Annual Report of the Technical Division of National Institute of Physiological Sciences, No. 10, Oct. 1, 1995, pp. 40-43. (Cited in copending U.S. Appl. Nos. 13/389,362 and 13/389,348.).

Togawa et al., "Prototype of Monkey Chair for experiments of Brain Higher Function", Annual Report of the Technical Division of National Institute for Physiological Sciences, No. 9, Sep. 1, 1994, pp. 50-53.(Cited in copending U.S. Appl. Nos. 13/389,362 and 13/389,348).

Kamimura, "About Training as to Treatment of Primates in the Primate Research Institute, Kyoto University", Japanese Association for Experimental Animal Technologists Hokkaido Shibu Kaisha, No. 21, Sep. 1, 1997, pp. 23-26.(Cited in copending U.S. Appl. Nos. 13/389,362 and 13/389,348.).

International Search Report of PCT/JP2010/063362, mailing date of Oct. 26, 2010, related to copending U.S. Appl. No. 13/389,362.

International Preliminary Report on Patentability (Form PCT/IB/373) of International Application No. PCT/JP2010/063362 mailed Mar. 13, 2012 with Form PCT/ISA/237, related to copending U.S. Appl. No. 13/389,362.

International Search Report of PCT/JP2010/063363, mailing date of Oct. 26, 2010, related to copending U.S. Appl. No. 13/389,348.

International Preliminary Report on Patentability (Form PCT/IB/373) of International Application No. PCT/JP2010/063363 mailed Mar. 13, 2012 with Form PCT/ISA/237, related to copending U.S. Appl. No. 13/389,348.

* cited by examiner (A)

(B)

(C)

PRIMATE RESTRAINT DEVICE

TECHNICAL FIELD

The present invention relates to an improvement of a restraint device for temporarily containing primates during an experiment when the primates are used in the experiment as an experimental animal.

BACKGROUND ART

In the development of pharmaceutical products to be used in medical examination or treatment of diseases of human beings, in order to examine in advance how the drug influences human bodies, the drugs need to be administered to animals to confirm their efficacy.

As such laboratory animals, mice, rats, dogs, rabbits, monkeys and many other animals are used. However, in order to examine the efficacy of the drugs to be administered to human beings most accurately, the use of primates (hereinafter referred to as "monkeys") is the most optimal.

In order to perform oral administration, transnasal intra-gastric administration, or intravenous injections of drugs to a monkey, to collect blood therefrom, to examine the state of pupils thereof, or to hold the head thereof in case of need, it is necessary to restrain the monkey so that the monkey cannot move freely. Thus, as a restraint device which restricts the movement of the monkey and facilitates work, a restraint device as shown in Patent Documents 1 to 3 has been proposed.

Each of these restraint devices is a device into which a monkey is transferred from a home cage for keeping the monkey, and with which each of the above-described operations is to be performed in that state.

This type of restraint device is usually provided with a shutter that can be freely opened and closed on its rear surface side, and hooks for hooking and fixing the restraint device on the front of the home cage is also provided on the same rear surface side.

This type of restraint device is usually used as follows. That is, the restraint device is fixed by the hooks so that the shutter matches the door that can be freely opened and closed on the front surface of the home cage. Then, the home cage door and the shutter are opened at the same time, the monkey is forced into the restraint device and then, the shutter is closed so that transfer of the monkey to the restraint device is completed.

After the monkey is transferred into this restraint device, a partition wall to which operation handles are connected is pushed rearward, and while the monkey is forced rearward so as to restricts its movement, an intended treatment is performed. Moreover, depending on the purpose of the treatment, limbs of the monkey are pulled out frontward through a lattice of the partition wall and tied to the operation handles or the like with bands or the like so as to restricts their movement.

CITATION LIST

Patent Documents

Patent Document 1: JP 08-24506 B
Patent Document 2: WO 2011/016546 A1
Patent Document 3: WO 2011/016547 A1

SUMMARY OF INVENTION

Problems to be Solved by the Invention

If the limbs of the monkey in the restraint device is pulled out frontward through the lattice of the partition wall and tied to the operation handles or the like with a band or the like so as to restricts its movement as mentioned above, the roots of the limbs, that is, its armpits and groins are strongly brought into contact with vertical bars constituting the lattice of the partition wall, these portions are sometimes grazed, and the skin is irritated or the skin of the portion in contact might develop various types of damages such as erosion or abrasion. Such damages not only undermines health of the monkey but also affects accuracy of the experiment.

The present invention has a first object to reduce or solve such damages by reducing friction with the vertical bars of the lattice of the partition wall which causes the damages on the roots of the limbs of the monkey when the monkey is restrained by the restraint device.

Moreover, in addition to the above-described first object, the present invention has a second object to reduce or solve damages on distal ends of the limbs when tying the limbs of the monkey.

Furthermore, in addition to the above-described first or second object, the present invention has a third object to reduce or solve a possibility of damaging the tail or limbs of the monkey by a lock mechanism when the shutter on the rear surface side is closed and locked after the monkey is transferred from the home cage into the restraint device.

Moreover, in addition to the above-described first, second or third object, the present invention has a fourth object to make the restraint device usable commonly for a male monkey and a female monkey with different body sizes among adult monkeys.

Means to Solve the Problems (1) First Invention

In order to achieve the above-described first object, a first invention of the present application is a primate restraint device comprising:

a containing body which has both side surfaces, a top surface, and a bottom surface;

a rear surface door which is provided on a rear surface side of the containing body and is capable of opening and shutting the rear surface side of the containing body by sliding up and down;

a partition wall which is formed movably frontward and rearward in the containing body while shutting an inside of the containing body from a front surface side and is formed fixable at a desired position within the containing body;

a pair of operation handles each of which comprises an upper side portion and a lower side portion extending frontward in parallel from the partition wall and a perpendicular portion which connects distal ends of the upper side position and the lower side portion;

a pair of latch members each of which extends frontward in parallel between the upper side portion and the lower side portion from the partition wall and has a distal end connected to the perpendicular portion; and lock devices which are provided on both sides on the front surface of the containing body and fix the latch members at desired positions;

wherein each of the partition wall and the rear surface door and the both side surfaces, the top surface and the bottom surface of the containing body is formed by assembling vertical bar members and horizontal bar members into a lattice pattern; and wherein some sites among the vertical bar members of the partition wall, with which roots of limbs of a primate are brought into contact while the limbs are forced to protrude frontward and restrained, are covered with protective cylinders which are rotatable with respect to the vertical bar members.

Here, the "front surface" in the present invention refers to the nearer face to a worker facing the restraint device. Further, the "rear surface" refers to a face opposite to the front surface, that is, the farther face from the worker facing the restraint device.

Further, the "containing body" has wall surfaces consisting of both side surfaces, the top surface and the bottom surface. In other words, as a basic mode, the containing body may be formed in a substantial box shape with the front surface and the rear surface open. However, the containing body according to the present invention is not limited to the mode that has the front surface and the rear surface completely open. That is, it is only necessary that the rear surface side is capable of being open to such a degree that it can be used at least as an entrance for a monkey. Moreover, the front surface side is preferably open, considering ease of a work and the like, but, as embodiments of the present invention, is not limited to the open mode. For example, a mode in which part of the front surface side or the rear surface side is not open by providing a member or the like for reinforcing the structure of the containing body on the front surface side or the rear surface side is possible.

By the way, each wall surface of this containing body is formed by assembling vertical bar members and horizontal bar members into a lattice pattern. Note that the term "lattice pattern" mentioned herein may be such that vertical bars and horizontal bars are fixed so as to intersect each other at right angles and to form wall surfaces, and it does not have to be a lattice pattern in a strict sense, in which the bar members are arranged at equal intervals. That is, the mode in which a part of the vertical bars or the horizontal bars are fractured is also included. Note that it is assumed that the "vertical" direction in the top surface and the bottom surface refers to as the front and rear directions and the "horizontal" direction refers to as the right and left directions.

Moreover, the "rear surface door" is provided on the rear surface side of the containing body and is capable of opening and shutting the rear surface side of the containing body by sliding up and down. That is, by opening this rear surface door, a monkey can be contained from the rear surface side of the containing body. Then, by shutting the door, the contained monkey can be locked up within the containing body.

The "partition wall" is formed movably forward and backward within the containing body by the pair of operation handles while shutting the inside of the containing body from the front surface side. Then, this partition wall can be fixed at a desired position within the containing body. By being thus formed, this partition wall can be moved forward and backward within the containing body and limit the range of movement of contained monkey. Specifically, by moving the partition wall rearward after the monkey is contained, the contained space of the monkey in the containing body is narrowed and the movement of the monkey can be restricted. Then, since this partition wall can be fixed at a desired position within the containing body, it can be fixed in a state wherein the movement of the monkey is restricted. Note that it is only necessary that the fixation of the partition wall mentioned herein can at least obstruct the movement of the partition wall to a direction that enlarges the contained space of the monkey and the movement of the partition wall to a direction to narrow the contained space of the monkey may be made freely. Note that the fixation of the partition wall is specifically performed by the pair of latch members mentioned above and lock devices corresponding to each of them.

Then, in the first invention, protective cylinders are equipped to some sites among the vertical bar members of the partition wall, with which roots of limbs of the monkey is brought into contact while the monkey is restrained. These protective cylinders rotatably cover over the applied sites of the vertical bar member. Thereby, a diameter of the applied site of the vertical bar member becomes larger, and a pressure to the contacted site can be reduced. Moreover, since these protective cylinders are rotatable, when the contacted sites move, the protective cylinders rotate according to the movement, whereby frictions are reduced.

(2) Second Invention

In order to achieve the above-described second object, a second invention of the present application is, in addition to the characteristics of the first invention, characterized in that:

a plurality of serrated lock grooves are formed on a lower side of each of the latch member;

an engagement key to be engaged with the lock groove is provided in each of the lock devices; and an arbitrary one of the plurality of lock grooves is engaged with the engagement key of the lock device so that the partition wall can be fixed at a desired position inside the containing body.

That is, when tying the limbs of the restrained monkey to the latch members, since the lock grooves 45 are formed downward, damages on the tied limbs can be reduced or prevented.

(3) Third Invention

In order to achieve the above-described third object, a third invention of the present application is, in addition to the characteristics of the first or second invention, characterized in that a lock portion for the rear surface door is provided on the top surface side.

That is, after the monkey is transferred into the containing body, since a portion for shutting and locking the rear surface door is provided on the top surface side, damages on the tail or limbs in contact with the bottom surface during locking can be reduced or prevented.

(4) Fourth Invention

In order to achieve the above-described fourth object, a fourth invention of the present application is, in addition to the characteristics of the first, second or third invention, characterized in that side shutters which are slidable upward and downward for changing intervals between the vertical bar members are provided on the both side surfaces of the containing body.

Thereby, widths of lattice portions through which an experimenter puts his/her hand from the side surfaces into the containing body for the need of the experiment can be adjusted by opening and shutting these side shutters in accordance with a size of a monkey to be contained. Thereby, a small-sized monkey such as a female monkey is prevented from escaping through the width of the lattice which is unnecessarily large.

Advantageous Effects of the Invention

Since the present invention is configured as above, effects described below are exerted.

That is, according to the configuration of the above-described first invention, when restraining in the restraint device, frictions with the vertical bars of the lattice of the partition wall causing damages on the roots of the limbs of the monkey is alleviated, and such damages can be reduced or solved.

Moreover, according to the configuration of the above-described second invention, in addition to the effect of the first invention, damages on the distal ends of the limbs while the limbs of the monkey being tied can be also reduced or solved.

Furthermore, according to the configuration of the above-described third invention, in addition to the effect of the first or second invention, a possibility of damaging the tail or limbs of the monkey by the lock mechanism when the shutter on the rear surface side is closed and locked after the monkey is transferred from the home cage into the restraint device can be reduced or solved.

Moreover, according to the configuration of the above-described fourth invention, in addition to the effect of the first, second or third invention, the restraint device can be commonly used for a male monkey and a female monkey with different body sizes among adult monkeys.

DESCRIPTION OF EMBODIMENTS

An embodiment of the present invention will be described by referring to FIGS. 1 to 5.

(Restraint Device 10)

Figure 2:
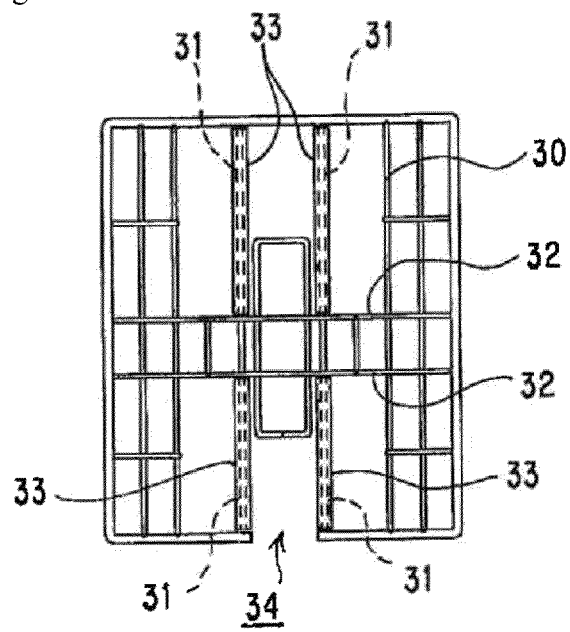
FIG. 2 is a front view of a partition wall in FIG. 1.
Figure 3:
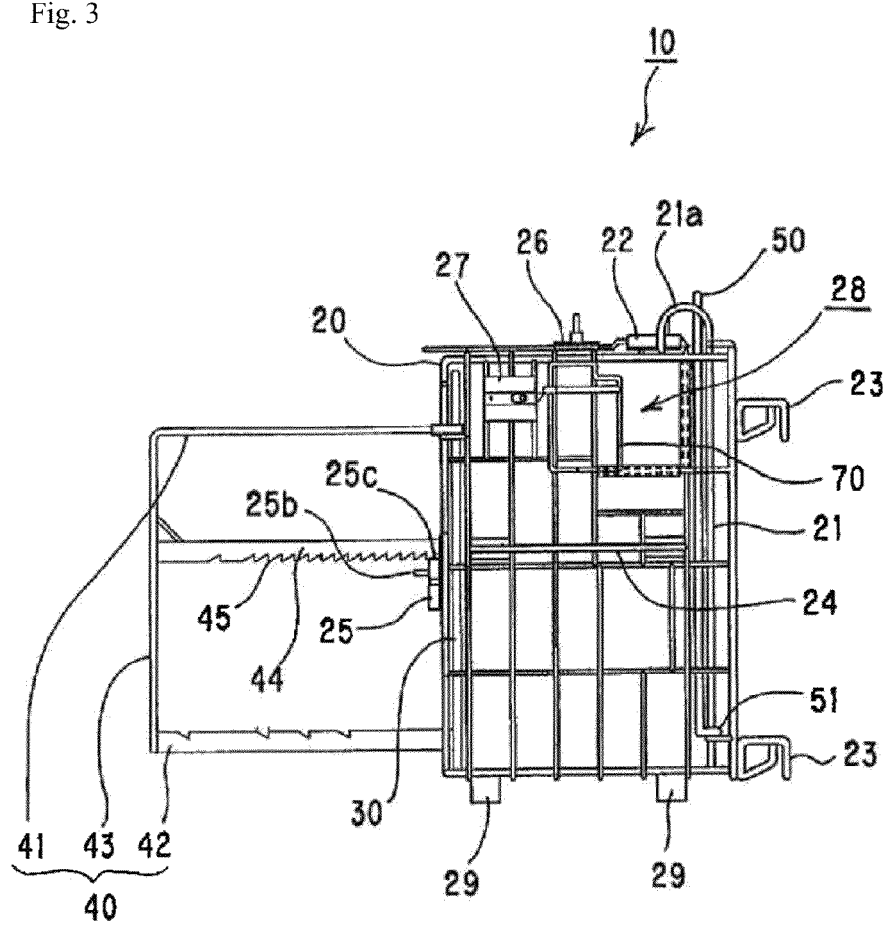
FIG. 3 is a right side view of the restraint device in FIG. 1.

A restraint device 10 according to this embodiment is mainly composed of a containing body 20, a rear surface door 50, and a partition wall 30 as main members as illustrated in FIG. 3. Further, as illustrated in FIGS. 1 and 2, the restraint device 10 according to this embodiment forms a box-shaped cage with the containing body 20, the rear surface door 50, and the partition wall 30.

(Containing Body 20 and Rear Surface Door 50)

Figure 1:
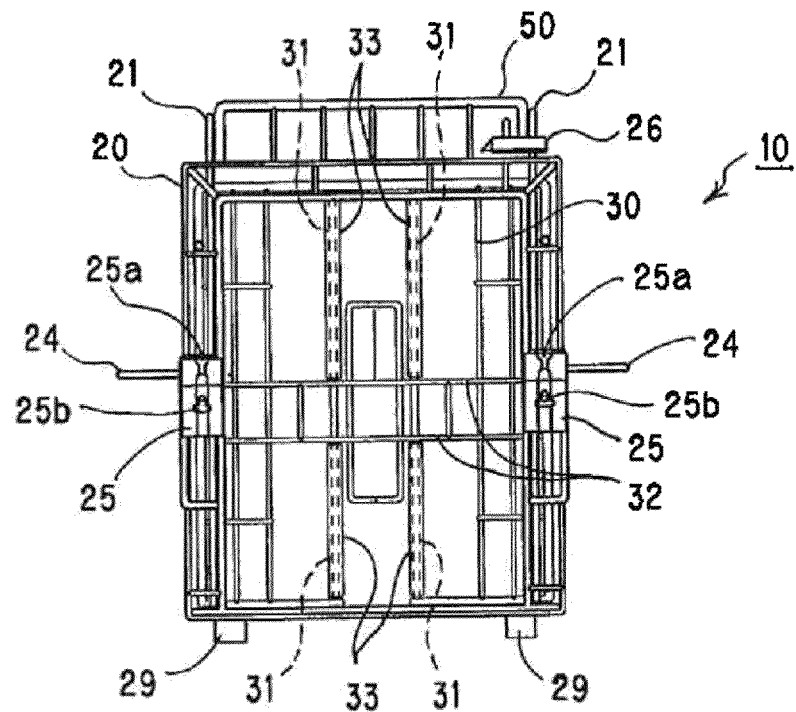
FIG. 1 is a front view of a restraint device according to an embodiment of the present invention. Note that operation handles and latch members are omitted.

As illustrated in FIG. 1, the containing body 20 forms both side surfaces, a top surface, and a bottom surface by assembling round rod-shaped stainless steel materials into a lattice pattern so as to form a wall surface. Then, the front surface and the rear surface are left open.

Figure 4:
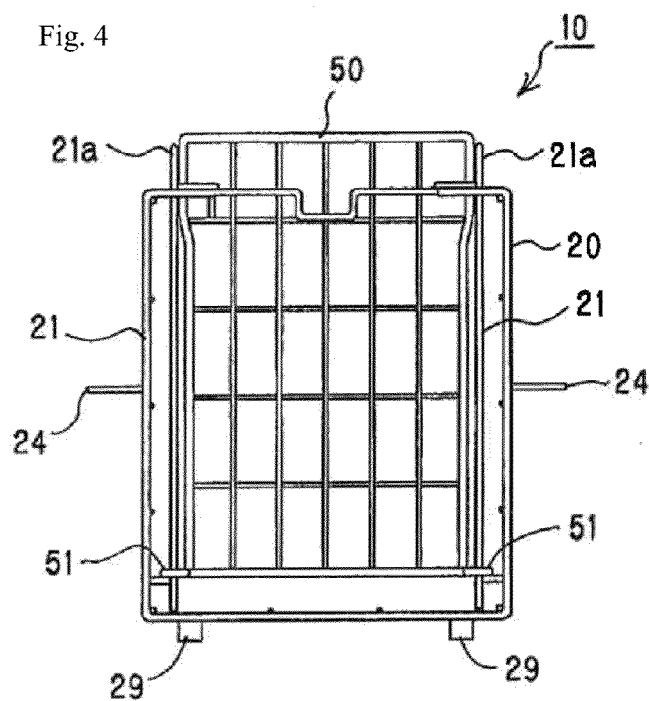
FIG. 4 is a rear view of the restraint device in FIG. 1. Note that hooks are omitted.

Further, on the rear surface side, as illustrated in FIG. 4, the rear surface door 50 is provided which can open and close the rear surface side of the containing body 20 by sliding up and down. An upper end of this rear surface door 50 is formed to protrude above the containing body 20 so that it can be pulled up easily.

Although this rear surface door 50 closes the rear surface side of the containing body 20 in a state illustrated in FIGS. 3 and 4, the rear surface side of the containing body 20 can be left open by pulling up the rear surface door 50 as below. That is, as illustrated in FIGS. 3 and 4, rod-shaped rear surface door guide members 21 in parallel with right and left supports of the rear surface door 50 and corresponding to each of the supports are installed upright in the containing body 20. Further, a lower end portion of the rear surface door 50 forms ring portions 51, and by inserting the rear surface door guide members 21 into holes of these ring portions 51, the rear surface door 50 can be slid upward along the rear surface door guide members 21. Moreover, an upper end of the rear surface door guide members 21 are curved in inverted U-shapes so as to form curved portions 21a. Thus, as a result of lifting up the rear surface door 50, if the ring portions 51 of the rear surface door 50 reach these curved portions 21a, the upper side of the rear surface door 50 is pulled down forward so that the rear surface door 50 can be stacked on the top surface of the containing body 20. Thereby, the state where the rear surface side of the containing body 20 is left open can be maintained, and an operation can be freely performed in this state.

Figure 5:
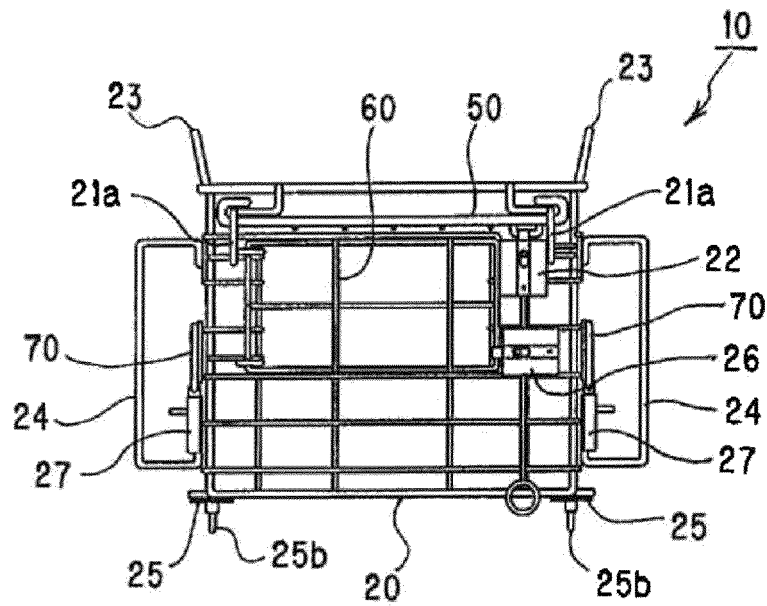
FIG. 5 is a plan view of the restraint device in FIG. 1. Note that the partition wall, the operation handles, and the latch members are omitted.

Moreover, a rear surface door lock device 22 for maintaining a closed state of the rear surface door 50 is provided in the vicinity of the rear end of the top surface of the containing body 20 (see FIG. 5).

Note that this restraint device 10 is assumed to be used by being attached to the horizontal bar of the lattice on the front surface of the cage in which a monkey is kept. Thus, hooks 23 are provided at appropriate positions on upper parts and lower parts on the rear surface of the containing body 20. That is, the restraint device 10 can be fixed to the cage by hooking these hooks 23 on the horizontal bar of the lattice on the front surface of the cage. Further, a door as an entrance and an exit for a monkey is provided on the front surface of the cage. Then, if the door of the cage and the rear surface door 50 are opened after the restraint device 10 is fixed to the cage, the inside of the cage communicates with the inside of the restraint device 10, and the monkey in the cage can be transferred into the restraint device 10.

By the way, FIG. 5 is a plan view of the restraint device 10 according to this embodiment seen from above, and, as illustrated in this FIG. 5, a top-portion door 60 is provided on the top surface of the containing body 20 in order to access the monkey contained in the restraint device 10 from above. This top-portion door 60 is formed capable of being locked by a top-portion door lock device 26 and cannot be easily opened from the inside. Moreover, intervals of the lattice of this top-portion door 60 in the front and rear direction are formed wider than intervals of the lattice on the top surface of the containing body 20 in the front and rear direction. Thereby, an experiment operation performed by accessing the monkey from above such as administration of eye-drops to the monkey and the like between the lattice of this top-portion door 60 is facilitated.

Moreover, as illustrated in FIG. 3, side shutters 70 which are slidable upward and downward are provided on both side surfaces of the containing body 20. These side shutters 70 are fixed by side shutter lock devices 27 also provided on the both side surfaces. For example, the state illustrated in FIG. 3 shows a state where the side shutter 70 is fixed at a closed position by the side shutter lock device 27. In this state, the width between the lattice of a side-surface operation space 28 located in the rear of this side shutter 70 is narrow. Thus, this state is suitable for preventing a monkey from escaping from this side-surface operation space 28 when a relatively small-sized monkey such as a female monkey is used as a subject. On the other hand, by once releasing this side shutter lock device 27 and sliding the side shutter 70 upward and then, by returning the side shutter lock device 27, the side shutter 70 is fixed at an open position at which the shutter is moved upward. In this state, the width between the lattice of the side-surface operation space 28 is larger than that at the above-described closed position. This state is suitable when a relatively large-sized monkey such as a male monkey without a concern of escape from the lattice of the side-surface operation space 28 is used as a subject. Note that this side-surface operation space 28 is used when an experimenter inserts his/her hand therethrough and performs a predetermined operation to the monkey inside, and the width is preferably kept as wide as possible as long as there is no concern of the escape of the monkey inside. Moreover, regardless of the size of the monkey used as a subject, it is possible to fix this side shutter 70 in the open state only if necessary in the experiment and to fix it in the closed state if unnecessary.

Furthermore, transport handles 24 is provided each on the both side surfaces of the containing body 20 so that the restraint device 10 itself can be moved easily. Note that the widths of these transport handles 24 are designed larger than conventional products in consideration of convenience when instruments required for experiments are hooked and suspended.

Further, leg portions 29 to stably place the restraint device 10 on the ground are provided on the bottom surface of the containing body 20.

(Partition Wall 30)

Subsequently, the partition wall 30 according to this embodiment will be described.

The partition wall 30 is a member attached to the containing body 20 so as to narrow the contained space for the monkey in the containing body 20, whereby the movement of the monkey is restricted. This partition wall 30 is located inside the containing body 20 and is movable frontward and rearward therein. Further, frontward of this partition wall 30 are connected operation handles 40 used for a moving operation thereof and latch members 44 for fixing the moved partition wall 30 at an arbitrary position within the containing body 20 (note that the operation handles 40 and the latch members 44 are omitted in FIGS. 1 and 2).

The partition wall 30 is formed movable frontward and rearward in the containing body 20 while shutting the inside of the containing body 20 from the front surface side and, further, is fixed at a desired position within the containing body 20. That is, the inside of the containing body 20 is divided by the partition wall 30 to the front and the rear. Moreover, the wall surface of the partition wall 30 has, as illustrated in FIG. 2, a structure in which the vertical bar members 31 and the horizontal bar members 32 are assembled into a lattice pattern like the wall surface of the containing body 20. Among the vertical bar members 31 constituting this partition wall 30, four members, which is located above and below two horizontal bar members 32 penetrating through the width direction and also is located closer to the center, are covered with pipe materials having inner diameters larger than outer diameters of these vertical bar members 31. These pipe materials are referred to as protective cylinders 33. Since these protective cylinders 33 are located with sufficient clearances with respect to the vertical bar members 31 located within their internal spaces, they are rotatable with respect to the vertical bar members 31. Moreover, the member located lowermost among the horizontal bar members 32 constituting the partition wall 30 is separated at its middle part. This separated portion is referred to as a separated portion 34. This separated portion 34 is for facilitating pulling out testicles of a male monkey through the bottom surface when necessary in an experiment when a male monkey is used as a subject, for example.

Further, on this partition wall 30, as described above, the operation handles 40 extending frontward, each having a U-shape on side view, are connected on right and left on front view. Specifically, each of these operation handles 40 has the U-shape on side view with the upper side portion 41 and the lower side portion 42 in parallel in a vertical direction and the perpendicular portion 43 connecting their distal ends. Then, the partition wall 30 can be moved rearward by pushing these operation handles 40 rearward, and the partition wall 30 can be moved frontward by pulling this operation handles 40 frontward.

Moreover, between the upper side portion 41 and the lower side portion 42 of each of the right and left operation handles 40, the plate-shaped latch member 44 is provided in parallel with them. Each of these latch members 44 is inserted into the latch member insertion opening 25a of the partition wall lock device 25 provided on the containing body 20. Thereby, each of these partition wall lock devices 25 guide the frontward and backward movement of the partition wall 30 and also plays a role of fixing the partition wall 30 at a desired position within the containing body 20. That is, the serrated lock grooves 45 are formed on the lower surface of each of these latch members 44 and meshed with the engagement key 25c (see FIG. 3) of the partition wall lock device 25 provided under the latch member insertion opening 25a. Thereby, even though the partition wall 30 can move freely rearward, it cannot move freely frontward. Note that, if the partition wall 30 is to be moved frontward, it is only necessary to operate an unlock pin 25b of the partition wall lock device 25 downward. Thereby, the partition wall 30 can be moved in a state where the lock groove 45 of the latch member 44 is disengaged from the engagement key 25c of the partition wall lock device 25.

Use Example

A specific use example of this restraint device 10 is as follows.

First, the hooks 23 of the restraint device 10 is hooked on a lateral beam of the lattice on the front surface of the cage containing a monkey, and the restraint device 10 is fixed to the cage.

Then, the unlock pins 25b of the partition wall lock devices 25 are operated so as to disengage the engagement keys 25c of the partition wall lock devices 25 from the lock grooves 45 of the latch members 44 and the operation handles 40 are pulled forward. Thereby, the partition wall 30 is moved frontward, and it is ensured that the contained space for the monkey in the containing body 20 is sufficiently large.

Subsequently, the rear surface door 50 is pulled upward, and its upper side is pulled down frontward and stacked on the top surface of the containing body 20. Thereby, the rear surface side of the containing body 20 is opened. Then, the door of the cage is opened so as to make the insides of the cage and the restraint device 10 communicate with each other. In this state, the monkey is transferred into the restraint device 10.

After the monkey is transferred into the restraint device 10, the rear surface door 50 is pulled down, and the door of the cage is closed. Then, the rear surface door 50 is locked by the top-portion door lock device 26.

Then, the partition wall 30 is moved rearward by pushing the operation handles 40 rearward. Thereby, the contained space for the monkey in the containing body 20 is narrowed, and the movement of the monkey can be restricted.

After the movement of the monkey is restricted, the four limbs of the monkey are pulled out frontward through the lattices outside each of the four protective cylinders 33. Among the four limbs having been pulled out, the upper limbs are tied to the latch members 44 and the lower limbs are tied to the lower side portions 42 of the operation handles 40 by bands or the like, respectively, and restrained. At this time, at sites of contact between the roots of the four limbs and the vertical bar members 31 which cause friction, the pressure by the friction can be reduced by radii of the contact sites being made larger by the protective cylinders 33. Moreover, even if the contact sites of the four limbs move, the protective cylinder 33 rotates with respect to the vertical bar member 31, thereby the pressure by the friction is reduced.

Figure 6:
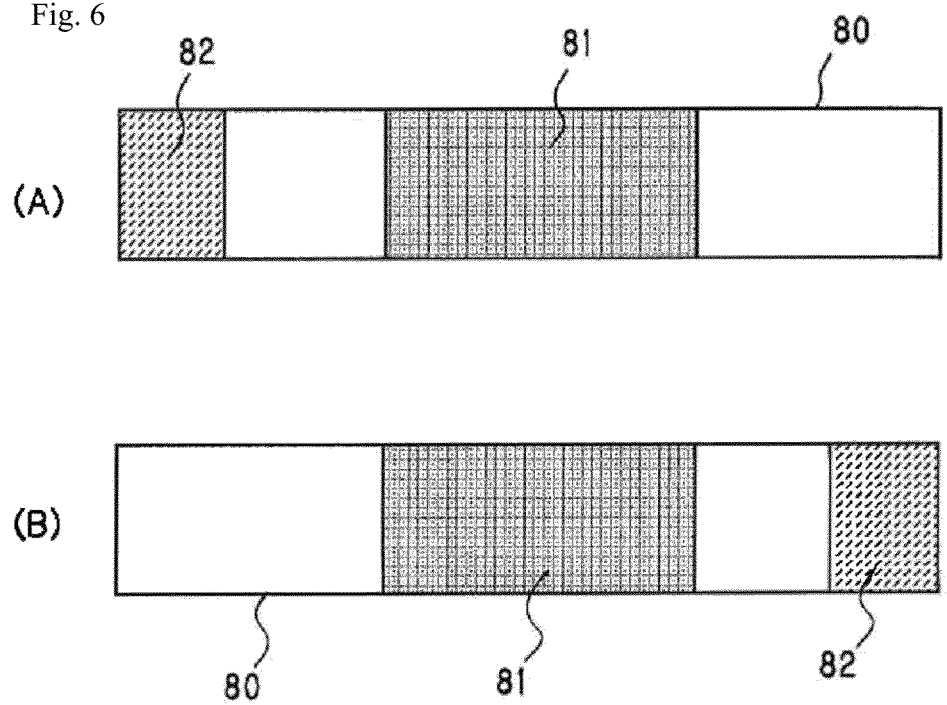
FIG. 6 illustrates a top side (A) and a bottom side (B) of a tying band used for restraining in the restraint device in FIG. 1.
Figure 7:
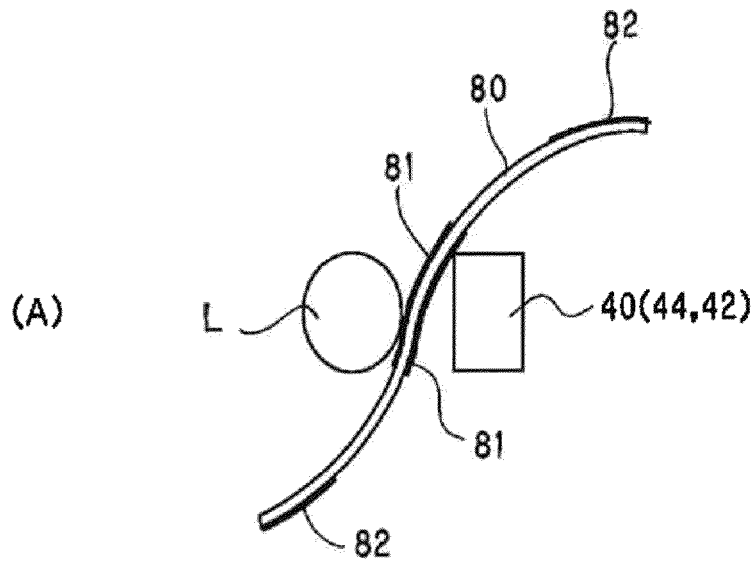
FIG. 7 is a schematic diagram illustrating a state before tying (A), an example of tying (B) and another example of tying (C) by the tying band in FIG. 6.
Figure 7:
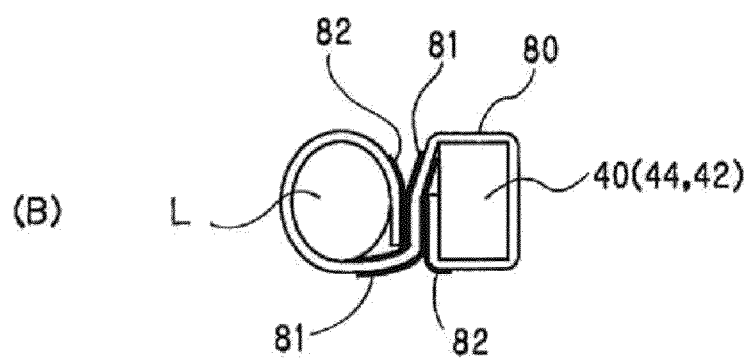
Figure 7:
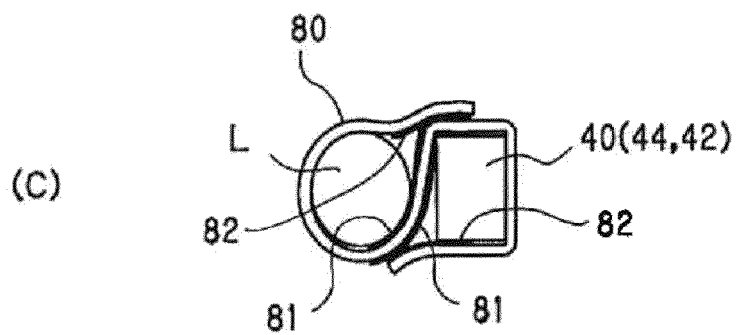

Note that, when the four limbs are fixed, use of a tying belt 80 as illustrated in FIG. 6 is preferable. This tying belt 80 has loop surfaces 81 of planar fastener attached to center regions on both of a top side and a bottom side of a band-shaped cloth and also has hook surfaces 82 of planar fastener attached to an end region on the top side and the other end region on the bottom side (note that the loop surfaces 81 and the hook surfaces 82 may be replaced with each other). Then, as illustrated in FIG. 7(A), this tying belt 80 is sandwiched between the limb L and the operation handle 40 (the latch member 44 or the lower side portion 42, the same goes for the following), and the hook surface 82 on each side is bonded to the loop surface 81 on the other side so that the limb L can be tied to the operation handle 40 in the figure of "8" on front view as illustrated in FIG. 7(B). Note that, as illustrated in FIG. 7(C), the limb L can also be tied by bonding the hook surface 82 on each side to the loop surface 81 on the same side, and binding can be accomplished by convenient methods as appropriate.

(Others)

The Other embodiment will be described below.

Figure 8:
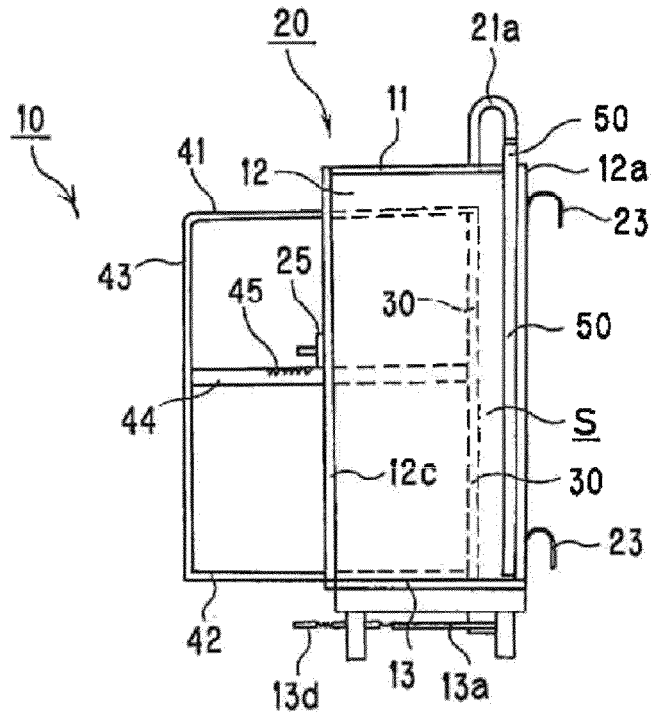
FIG. 8 is a side view illustrating an essential part with omission of vertical and horizontal bars and the like constituting a lattice for explaining an outline of a restraint device according to another embodiment of the present invention.

As illustrated in FIG. 8, regarding the primate restraint device 10 according to this embodiment, a top-surface lattice portion 11, side-surface lattice portions 12 and a bottom-surface lattice portion 13, each of which is made of metal, are integrally connected so as to constitute a rectangular containing body 20 in which the front surface and the rear surface are open, and on the open rear surface is provided a lattice-shaped rear surface door 50 which moves upward and opens in order for a monkey to be transferred from and into the restraint device 10. Note that the upper end of this rear surface door 50 protrudes above the top-surface lattice portion 11 so that manual operation can be made easily.

On the rear surface of the containing body 20 is placed a lattice-shaped partition wall 30 which are installed in the containing body 20 so as to be capable of sliding on the bottom-surface lattice portion 13 in the containing body 20 and of being fixed at a desired position within the containing body 20.

The restraint device 10 is usually used by being attached to a horizontal bar of the lattice on the front surface of the cage in which a monkey is kept. Thus, the hooks 23 are fixed at appropriate positions on upper parts and lower parts of a vertical frame 12a on the rear end of the side-surface lattice portion 12.

Figure 9:
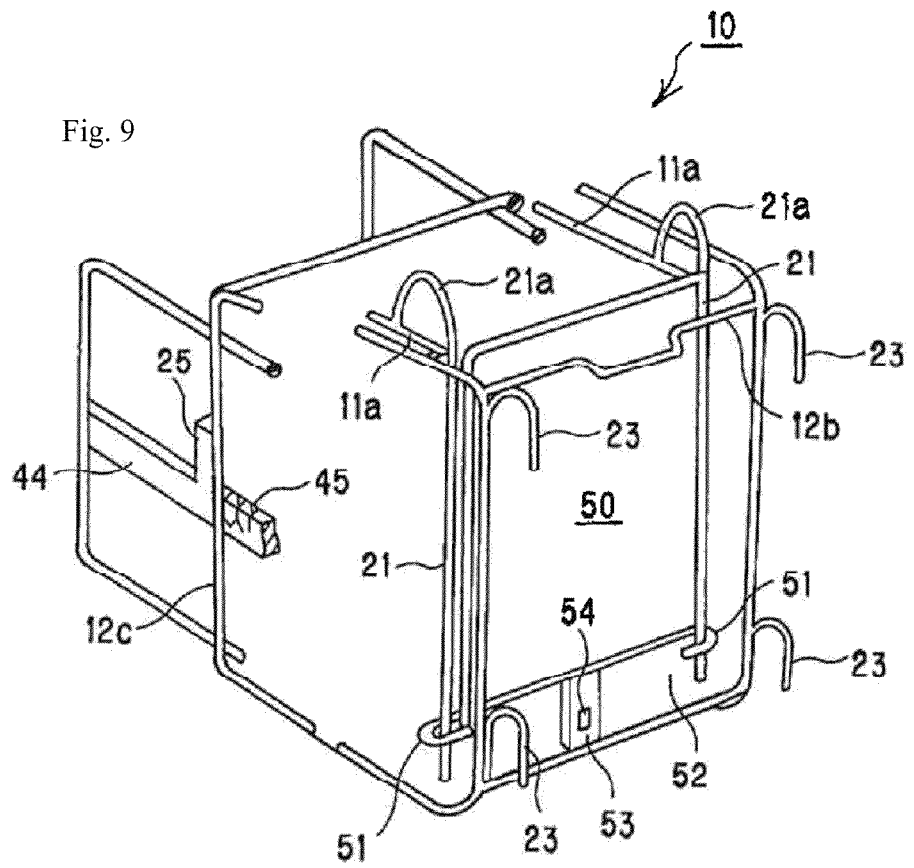
FIG. 9 is a substantial perspective view illustrating a framework of the restraint device in FIG. 8 in a partially broken manner.

As illustrated in FIG. 9, rear surface door guide members 21 are provided, which form inverted U-shaped curved portions 21a from both side ends of horizontal frame members 11a in the top-surface lattice portion 11 curving upward and rearward, and then extending downward.

The rear surface door 50 is attached along these rear surface door guide members 21 so that the rear surface door 50 moves vertically and is opened and closed. For that purpose, the both ends of a horizontal frame member 52 on the lower end of the rear surface door 50 are formed into the ring portions 51, through which the rear surface door guide members 21 are inserted. By lifting up and fully opening the rear surface door 50 and by pulling down the opened rear surface door 50 by 90 degrees forward to be stacked on the top-surface lattice portion 11 of the containing body 20 at a position where the ring portions 51 reach the curved portions 21a on the upper parts of the rear surface door guide members 21, thereby the rear surface door 50 can be kept in an open state. Note that a horizontal bar 12b is fixed to the upper end of the vertical frame 12a so as to support the rear surface door 50 from its bottom side.

Figure 10:
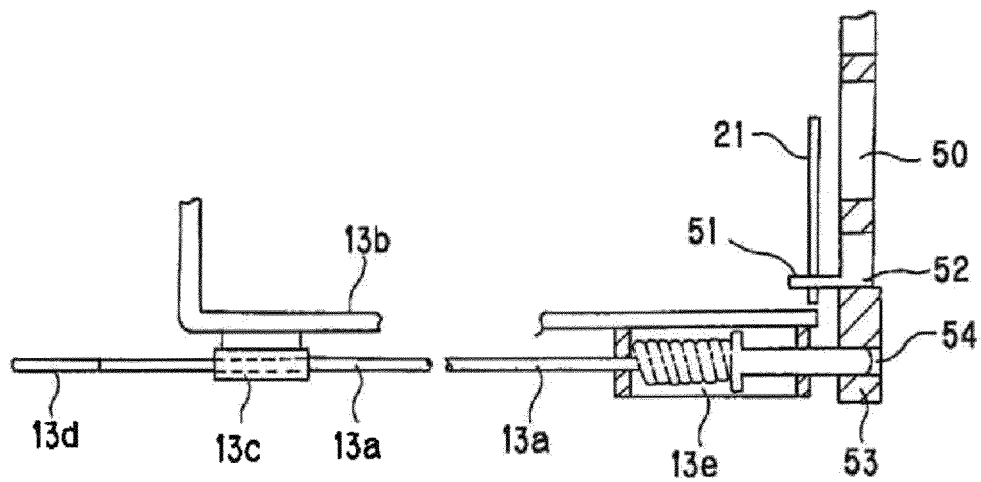
FIG. 10 is a substantial side view for explaining a lock bar for fixing a door of the restraint device in FIG. 8 with a partial section.

In order to keep the rear surface door 50 in the closed state, along the outer side surface at the center of the bottom-surface lattice portion 13, a lock bar 13a reaching the horizontal frame member 52 on the lower end of the rear surface door 50 from the front surface of the containing body 20 is attached to a support member 13c fixed to the horizontal bar 13b on the lower end of the bottom-surface lattice portion 13 so as to become movable with respect to the bottom-surface lattice portion 13 as illustrated in FIG. 10. Note that, on a front end of this lock bar 13a, a handle 13d is provided for operating it.

To the horizontal frame member 52 on the lower end of the rear surface door 50 is fixed a receiving member 53 of the lock bar 13a protruding downward from the center. In this receiving member 53 is formed an opening 54 with which a free end of the lock bar 13a is fitted.

The lock bar 13a locks the rear surface door 50 so that it does not move vertically when the rear surface door 50 is brought into the closed state by pressing the free end of the lock bar 13a toward the opening 54 of the receiving member 53 by an appropriate spring device 13e attached to the bottom-surface lattice portion 13.

Figure 11:
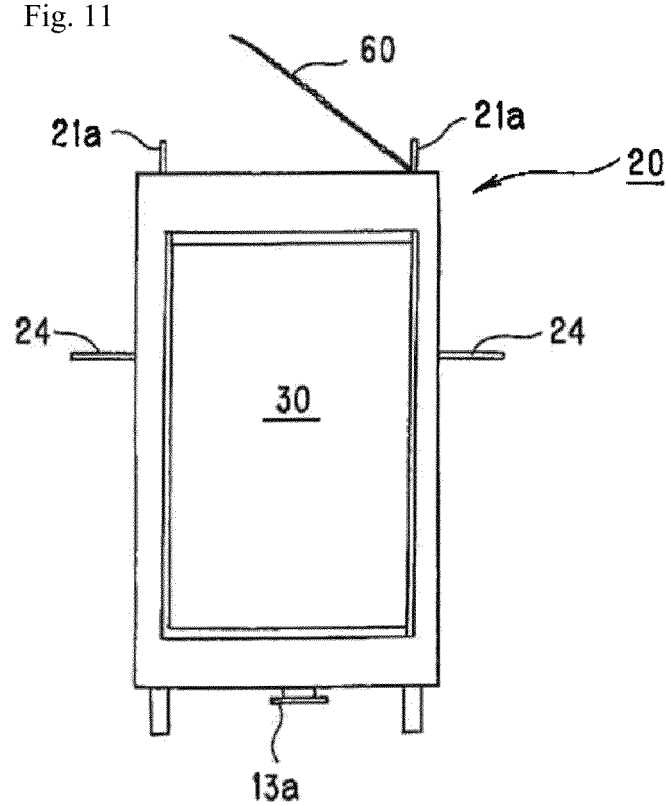
FIG. 11 is an elevation illustrating the restraint device in FIG. 8 with a top door half-open.

As illustrated in FIG. 11, the lattice-shaped top-portion door 60 can be pivotally attached by using a part of the horizontal bar of the lattice of the top-surface lattice portion 11 in order to approach the monkey contained in the restraint device 10 from above. Note that this top-portion door 60 is constructed capable of being nailed to a part of the horizontal bar of the lattice by appropriate means so as not to be easily opened from the inside.

The transport handles 24 of the restraint device 10 can be fixed to the horizontal bars at appropriate positions on the side-surface lattice portions 12 of the containing body 20.

The lattice-shaped partition wall 30 is inserted movably into the containing body 20 and narrows a space S in which a monkey is contained between the closed rear surface door 50 and the partition wall 30 to a desired width so that the monkey cannot move freely in the space S.

Figure 12:
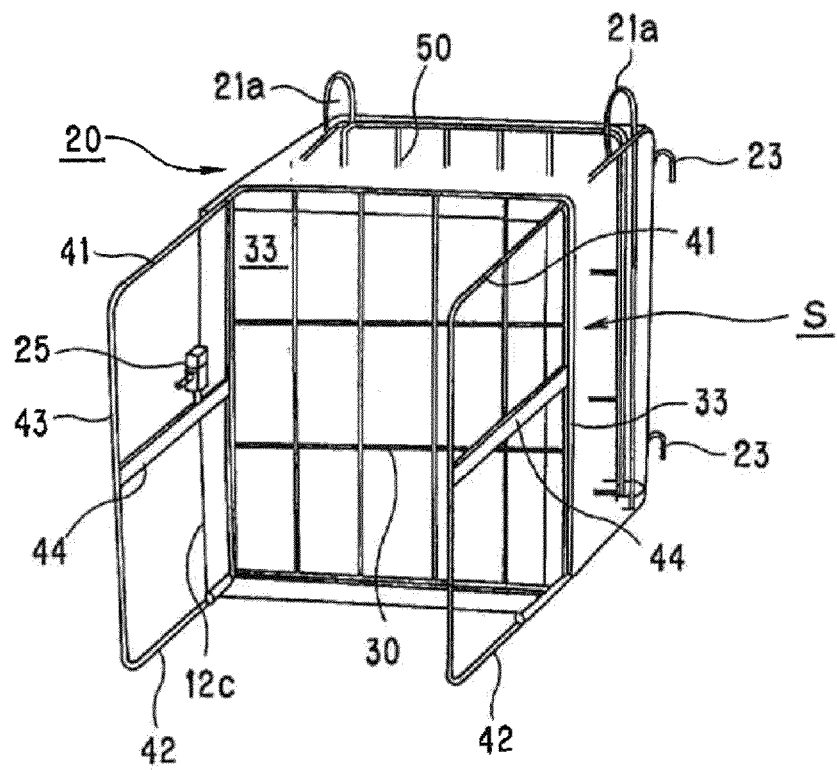
FIG. 12 is a substantial perspective view for explaining a partition wall of the restraint device in FIG. 8.

For that purpose, as illustrated in FIG. 12, the upper side portions 41 and the lower side portions 42 for moving the partition wall 30, which are fixed to the upper parts and the lower parts of the vertical frame members 35 on the both sides of the lattice-shaped partition wall 30 and which extend frontward horizontally from there for a predetermined length, respectively, are fixed to the both ends of the perpendicular portions 43 located on the front ends.

The latch members 44, in which the serrated lock grooves 45 are formed on the upper surfaces in order to allow free movement of the partition wall 30 to the rear of the containing body 20, that is, toward the rear surface door 50 but to prevent movement to the front which is opposite thereto, are fixed to the vertical frame members 35 of the partition wall 30 and the perpendicular portions 43 in the intermediate portions between the upper side portions 41 and the lower side portions 42 for moving the partition wall.

A partition wall lock devices 25 are attached to vertical frame members 12c on the front ends of the side-surface lattice portions 12 in order to fix the partition wall 30 to a desired position in the containing body 20 in collaboration with the latch members 44 having the lock grooves 45.

Figure 13:
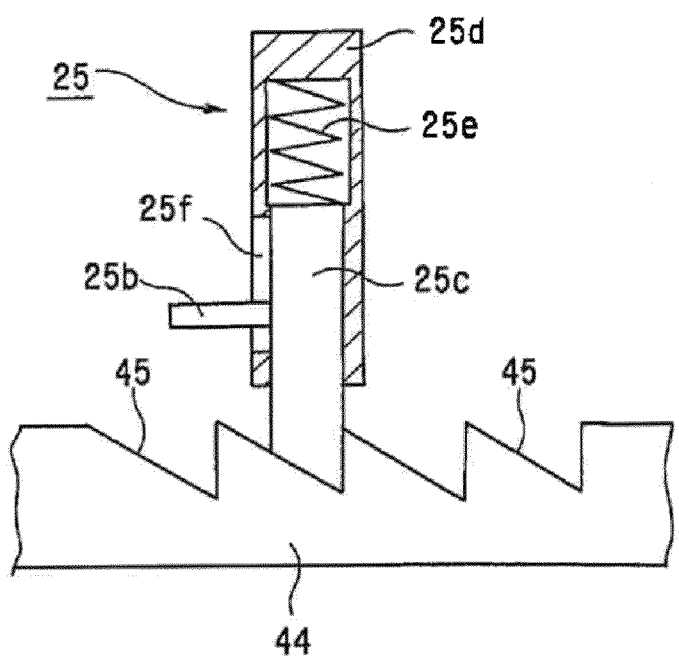
FIG. 13 is a substantial side sectional view of a lock/key device of the partition wall of the restraint device in FIG. 8.

Each of the partition wall lock devices 25 is, as illustrated in FIG. 13, composed of a casing 25d and the engagement key 25c which is subjected to an action of a spring 25e arranged on the upper end of the casing 25d and protrudes from the lower end of the casing 25d to mesh with the lock groove 45 of the latch member 44.

In order to pull up the engagement key 25c against the force of the spring 25e so as to disengage the lock groove 45 from the engagement key 25c and to allow the partition wall 30 to move freely toward the rear surface door 50, a vertical groove 25f is provided in the casing 25d so that the unlock pin 25b fixed to the engagement key 25c can slide to move the engagement key 25c upward.

The primate restraint device 10 of this embodiment is configured as described above in detail, and when an experiment of administration of a drug or the like is conducted on a monkey by using this device, the hooks 23 of the restraint device 10 are hooked by the horizontal bar of the lattice on the front of the cage in which the monkey is contained, and the restraint device 10 is fixed to the cage.

Subsequently, the unlock pin 25b of the partition wall lock device 25 is lifted up, and the engagement key 25c is removed from the lock groove 45 of the latch member 44 so as to allow free movement of the partition wall 30 and fixed at a position where the space S of a monkey containing portion between the rear surface door 50 of the restraint device 10 and the partition wall 30 is sufficiently enlarged.

Then, the handle 13d of the lock bar 13a is pulled forward to the experimenter, the free end of the lock bar 13a is withdrawn from the opening 54 of the receiving member 53 of the rear surface door 50 so as to unlock the rear surface door 50, the rear surface door 50 is opened upward and stacked on the upper surface of the top-surface lattice portion 11 of the containing body 20 and then, the door of the cage is opened so as to transfer the monkey into the space S in the containing body 20.

In order to easily transfer a monkey from the cage into the restraint device 10, a collar may be attached to a monkey in advance and a rod which collaborates with the collar may be used.

After the monkey enters the space S of the restraint device 10, the rear surface door 50 and the door of the cage are closed and then, the partition wall 30 is moved toward the rear surface door 50 so as to narrow the space S and prevents the monkey from moving freely. If the monkey is still moving, a rod is inserted into the ring attached to the collar of the monkey in advance and the movement of the monkey is stopped by fixing the rod by using the lattice.

After the monkey is thus brought into the restrained state in the restraint device 10, the leg of the monkey, for example, is pulled out through the lattice of the partition wall 30, and injection and other operations can be performed or the experimenter can approach the head of the monkey or the like by opening the top-portion door 60.

As described above, by using the primate restraint device 10 of this embodiment, the experimenter can solely transfer a monkey from the cage into the restraint device 10 and can restrict the movement of the monkey and thus, a desired experiment can be accomplished without being harmed by the monkey.

Moreover, according to the restraint device 10 of this embodiment, since it is not necessary to hold the monkey with many people as before, the monkey does not suffer from mental stress and experiment result can be obtained in a normal state.

INDUSTRIAL APPLICABILITY

The present invention can be used as a restraint device for temporarily containing a primate during an experiment when a primate is used as an experiment animal in the experiment.

The invention claimed is:

1. A primate restraint device comprising: a containing body having both side surfaces, a top surface and a bottom surface; a rear surface door being provided on a rear surface side of the containing body and being capable of opening and shutting the rear surface side of the containing body by sliding up and down;
   a partition wall being formed movably frontward and rearward in the containing body while shutting an inside of the containing body from a front surface side and being formed fixable at a desired position inside the containing body;
   a pair of operation handles each comprising an upper side portion and a lower side portion extending frontward in parallel from the partition wall and a perpendicular portion connecting distal ends of the upper side portion and the lower side portion;
   a pair of latch members each extending frontward in parallel between the upper side portion and the lower side portion from the partition wall and having a distal end connected to the perpendicular portion; and
   lock devices being provided on both sides on the front surface of the containing body and fixing the latch members at desired positions: and
   a plurality of side shutters provided on the both side surfaces of the containing body, each of the plurality of side shutters comprising a first plurality of vertical bar members,
   wherein each of the partition wall, the rear surface door, the both side surfaces, and the top surface and the bottom surface of the containing body comprises vertical bar members and horizontal bar members in a lattice pattern, the vertical bar members of each of the both side surfaces being a second plurality of vertical bar members;
   wherein the lattice pattern of the partition wall defines at least one grid,
   wherein each grid comprises a first vertical bar member and a second vertical bar member with a space therebetween for protruding a limb of a primate,
   wherein a protective cylinder encircles at least a portion of the first vertical bar member, with which roots of the limb of the primate are brought into contact while the limb is forced to protrude frontward through the grid and restrained,
   wherein the protective cylinder is freely rotatable with respect to the first vertical bar member, so that the protective cylinder is adapted to rotate in accordance with a movement of the limb of the primate through the space between the first vertical bar member and the second vertical bar member, wherein each of the plurality of side shutters is adapted to be selectively positioned in (i) a closed position in which the side shutter overlays the vertical bar members on one of the side surfaces of the containing body, and (ii) an open position in which the side shutter does not overlay the vertical bar members on the one of the side surfaces of the containing body, the side shutter being fixed in the closed position or the open position by a lock device provided on the side shutter, wherein, in a side view of the primate restraint device, in the closed position of the side shutter the distance between a vertical bar member of the first plurality of vertical bar members and an adjacent vertical bar member of the second plurality of vertical bar members is less than a distance between adjacent vertical bar members of the second plurality of vertical bar members, and wherein the sole function of the plurality of side shutters is to change intervals between the second plurality of vertical bar members by being selectively positioned in the open position and the closed position.

2. The primate restraint device according to claim 1, wherein:

a plurality of serrated lock grooves are formed on a lower side of each of the latch members;

an engagement key to be engaged with the lock grooves is provided in each of the lock devices; and an arbitrary one of the plurality of lock grooves is engaged with the engagement key of the lock device so that the partition wall can be fixed at a desired position inside the containing body.

3. The primate restraint device according to claim 1, wherein a lock portion for the rear surface door is provided on the top surface side.

4. The primate restraint device according to claim 2, wherein a lock portion for the rear surface door is provided on the top surface side.

5. The primate restraint device according to claim 1, wherein the protective cylinder and the first vertical bar member define a space therebetween, such that the protective cylinder is rotatable with respect to the first vertical bar member.

6. The primate restraint device according to claim 1, wherein the plurality of side shutters are adapted to be (i) slidable downward so as to be in the closed position, and (ii) slidable upward so as to be in the open position.

* * * * *